(12) United States Patent
Kumar et al.

(10) Patent No.: US 10,952,133 B2
(45) Date of Patent: Mar. 16, 2021

(54) METHOD AND SYSTEM FOR HANDLING COLLISION AND SYNCHRONIZATION CASES

(71) Applicant: Samsung Electronics Co., Ltd., Suwon-si (KR)

(72) Inventors: Lalith Kumar, Bengaluru (IN); Shweta Madhurapantula, Bengaluru (IN); Nitesh Pushpak Shah, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/676,339

(22) Filed: Nov. 6, 2019

(65) Prior Publication Data

US 2020/0145915 A1 May 7, 2020

(30) Foreign Application Priority Data

Nov. 6, 2018 (IN) .............................. 201841042014
Nov. 4, 2019 (IN) .............................. 201841042014

(51) Int. Cl.
*H04W 4/00* (2018.01)
*H04W 36/00* (2009.01)
(Continued)

(52) U.S. Cl.
CPC .............. *H04W 48/18* (2013.01); *H04W 8/02* (2013.01); *H04W 60/04* (2013.01); *H04W 60/06* (2013.01);
(Continued)

(58) Field of Classification Search
CPC ...... H04W 48/18; H04W 60/04; H04W 76/27; H04W 76/30; H04W 60/06; H04W 8/02; H04W 72/10; H04W 84/042; H04W 88/06
(Continued)

(56) References Cited

U.S. PATENT DOCUMENTS

2005/0037769 A1* 2/2005 Jami ..................... H04W 28/08
                                                         455/453
2013/0176885 A1* 7/2013 Lee .................. H04W 36/0083
                                                         370/252
(Continued)

OTHER PUBLICATIONS

International Search Report in connection with International Application No. PCT/KR2019/014973 dated Feb. 19, 2020, 3 pages.
(Continued)

*Primary Examiner* — Mark G. Pannell (57) ABSTRACT

Embodiments herein disclose a method for managing SOR information by UE in an automatic network selection mode in a wireless communication network. The method includes receiving the SOR information from one of a first VPLMN and a HPLMN and determining whether a SOR information security check is successful and the UE is camped on one of the first VPLMN and the HPLMN and performing one of: continuing to receive services from the HPLMN on determining that the UE is camped on the HPLMN irrespective of the SOR information security check, continuing to receive services from the first VPLMN on determining that the UE is camped on the first VPLMN and that the SOR information security check is successful, and automatically triggering a registration to a second VPLMN available on determining that the UE is camped on the first VPLMN and that the SOR information security check is unsuccessful.

10 Claims, 7 Drawing Sheets

(51) Int. Cl.
  *H04W 48/18*  (2009.01)
  *H04W 60/06*  (2009.01)
  *H04W 76/27*  (2018.01)
  *H04W 76/30*  (2018.01)
  *H04W 60/04*  (2009.01)
  *H04W 8/02*   (2009.01)
  *H04W 72/10*  (2009.01)
  *H04W 88/06*  (2009.01)
  *H04W 84/04*  (2009.01)

(52) U.S. Cl.
  CPC ........... *H04W 72/10* (2013.01); *H04W 76/27* (2018.02); *H04W 76/30* (2018.02); *H04W 84/042* (2013.01); *H04W 88/06* (2013.01)

(58) Field of Classification Search
  USPC ..................................................... 455/432.1
  See application file for complete search history.

(56) References Cited

U.S. PATENT DOCUMENTS

| | | | | |
|---|---|---|---|---|
| 2015/0312826 | A1* | 10/2015 | Yiu | H04W 48/16 455/437 |
| 2019/0182655 | A1* | 6/2019 | Gupta | H04W 12/1008 |
| 2019/0268752 | A1* | 8/2019 | Buckley | H04W 8/06 |
| 2019/0306910 | A1* | 10/2019 | Da Silva | H04W 8/08 |
| 2019/0313238 | A1* | 10/2019 | Palanigounder | H04W 12/0403 |

OTHER PUBLICATIONS

3GPP TS 23.122 V15.5.0 (Sep. 2018), Technical Specification, 3rd Generation Partnership Project; Technical Specification Group Core Network and Terminals; Non-Access-Stratum (NAS) functions related to Mobile Station (MS) in idle mode (Release 15), Sep. 2018, 62 pages.

3GPP TS 33.501 V15.2.0 (Sep. 2018), Technical Specification, 3rd Generation Partnership Project; Technical Specification Group Services and System Aspects; Security architecture and procedures for 5G system (Release 15), Sep. 2018, 176 pages.

Ericsson, "Correction to the Security Service for Steering of Roaming," S3-183222, 3GPP TSG-SA WG3 Meeting #92bis, Harbin (China), Sep. 24-28, 2018, 8 pages.

Samsung, "Living Document: Security of PLMN/RAT selection policies for roaming," S3-181907, 3GPP TSG SA WG3 (Security) Meeting #91bis, LaJolla, US, May 21-25, 2018, 11 pages.

Samsung, et al., "Updates on Security Mechanism for Steering of Roaming," S3-182470, 3GPP TSG-SA WG3 Meeting #92, Dalian (China), Aug. 20-24, 2018, 9 pages.

* cited by examiner

METHOD AND SYSTEM FOR HANDLING COLLISION AND SYNCHRONIZATION CASES

CROSS-REFERENCE TO RELATED APPLICATION

This application is based on and claims priority under 35 U.S.C. 119 to Indian Provisional Patent Application No. 201841042014 (PS) filed on Nov. 6, 2018 and Indian Complete Patent Application No. 201841042014 (CS) filed on Nov. 4, 2019 in the Indian Patent Office, the disclosures of which are herein incorporated by reference in their entirety.

BACKGROUND

1. Field

The present disclosure discloses relates to wireless communication, and more particularly to a method and a user equipment (UE) for managing a steering of roaming (SOR) information in an automatic network selection mode in a wireless communication network.

2. Description of Related Art

In general, a wireless communication service provider provides wireless communication (i.e., a home network) in a designated geographical area, such as a particular locality or a country etc. When a user equipment (UE) using a subscriber identity module (SIM) provided by the wireless communication service provider require service within the designated geographical area, the UE scans and attaches to a network of the wireless communication service provider. However, when the UE is mobile and moves out of the designated geographical area, the UE is said to be in roaming and obtains services by attaching to an available network of any other wireless communication service provider i.e., a visited network. Typically, the UE attaches to the visited network having strongest signal.

Generally, a home wireless communication service provider enters into agreements with preferred visited wireless communication service providers that provide coverage outside the home network. The agreements may provide for example, lower call charges, guaranteed service for roaming UEs from the home network. Therefore, the home network would prefer the UEs which are in roaming to attach to only the preferred visited wireless communication service providers with which the home network has entered into agreements. The home network indicates to the UEs the preferred visited wireless communication service providers using a Steering of Roaming (SoR) information/report. However, the visited network which wants to maintain the roaming UEs on the visited network may prevent the roaming UEs from moving away to any other visited network. In order to prevent the roaming UEs from moving away to any other visited network, the visited network uses anti-Steering of Roaming (Anti-SoR) techniques. The anti-SoR techniques may be one of tampering the SoR information, blocking the roaming UEs from accessing the SoR information by the visited network, moving the roaming UEs into an indefinite inactive state instead of idle state, etc.

The anti-SoR techniques employed by the visited network may result in huge revenue losses for the home network, and needs to be addresses.

Thus, it is desired to address the above mentioned disadvantages or other shortcomings or at least provide a useful alternative.

The principal object of the embodiments herein is to provide method for managing SOR information in an automatic network selection mode in wireless communication network.

Another object of the embodiments herein is to receive the SOR information from one of a first visitor public land mobile network (first VPLMN) and a home public land mobile network (HPLMN).

Another object of the embodiments herein is to determine whether a SOR information security check is successful and that the UE is camped on one of the first VPLMN and the HPLMN.

Another object of the embodiments herein is to continue to receive services from the HPLMN to which the UE is latched, in response to determining that the UE is camped on the HPLMN and the SOR information security check is one of successful and unsuccessful.

Another object of the embodiments herein is to continue to receive services from the first VPLMN to which the UE is latched, in response to determining that the UE is camped on the first VPLMN and that the SOR information security check is successful.

Another object of the embodiments herein is to automatically trigger a registration to a second VPLMN available in the wireless communication network, in response to determining that the UE is camped on the first VPLMN and that the SOR information security check is unsuccessful.

SUMMARY

Accordingly the embodiments herein disclose a method for managing a steering of roaming (SOR) information by user equipment (UE) (100) in an automatic network selection mode in a wireless communication network. The method includes receiving, by the UE (100), the SOR information from one of a first visitor public land mobile network (first VPLMN) (200a) and a home public land mobile network (HPLMN) (300) and determining, by the UE (100), whether a SOR information security check is successful. Further, the method includes determining, by the UE (100), that the UE (100) is camped on one of the first VPLMN (200a) and the HPLMN (300) and performing, by the UE (100), one of: continuing, by the UE (100), to receive services from the HPLMN (300) to which the UE (100) is latched, in response to determining that the UE (100) is camped on the HPLMN (300) and the SOR information security check is one of successful and unsuccessful, continuing, by the UE (100), to receive services from the first VPLMN (200a) to which the UE (100) is latched, in response to determining that the UE (100) is camped on the first VPLMN (200a) and that the SOR information security check is successful, and automatically triggering, by the UE (100), a registration to a second VPLMN (200b) available in the wireless communication network, in response to determining that the UE (100) is camped on the first VPLMN (200a) and that the SOR information security check is unsuccessful.

In an embodiment, the SOR information security check is successful when one of: an integrity check performed on the SOR information is successful; and the UE (100) receives the SOR information as part of the initial registration accept message when the UE (100) is configured to receive the SOR information in the initial registration accept message.

In an embodiment, the SOR information security check is unsuccessful when one of: an integrity check performed on the SOR information is unsuccessful and the UE (100) does not receive the SOR information as part of the initial registration accept message when the UE (100) is configured to receive the SOR information in the initial registration accept message.

In an embodiment, the second VPLMN (200b) is a PLMN the UE (100) latches to after performing a PLMN selection procedure, with the first VPLMN (200a) which sends the SOR information being considered with as a lowest priority PLMN during the PLMN selection procedure. In an embodiment, automatically triggering, by the UE (100), the registration to the second VPLMN (200b) available in the wireless communication network, in response to determining that the UE (100) is camped on the first VPLMN (200a) and that the SOR information security check is unsuccessful comprising receiving, by the UE (100), a Radio Resource Control (RRC) connection release message comprising an indication to the UE (100) to move to a RRC inactive state. In an embodiment, the method further includes de-registering, by the UE (100), from the first VPLMN (200a) to which the UE (100) is currently registered and selecting, by the UE (100), the second VPLMN (200b) which is the highest priority PLMN available as per the received OPLMN list in the SOR information. Furthermore, the method also includes automatically registering, by the UE (100), with the second VPLMN (200b).

Accordingly the embodiments herein disclose a user equipment (UE) (100) configured in an automatic network selection mode for managing a steering of roaming (SOR) information in a wireless communication network. The UE (100) includes a memory (140) and a processor (160) coupled to the memory (140). The processor (160) is configured to receive the SOR information from one of a first visitor public land mobile network (first VPLMN) (200a) and a home public land mobile network (HPLMN) (300) and determine whether a SOR information security check is successful. The processor (160) is also configured to determine that the UE (100) is camped on one of the first VPLMN (200a) and the HPLMN (300) and perform one of: continue to receive services from the HPLMN (300) to which the UE (100) is latched, in response to determining that the UE (100) is camped on the HPLMN (300) and the SOR information security check is one of successful and unsuccessful, continue to receive services from the first VPLMN (200a) to which the UE (100) is latched, in response to determining that the UE (100) is camped on the first VPLMN (200a) and that the SOR information security check is successful, and automatically trigger a registration to a second VPLMN (200b) available in the wireless communication network, in response to determining that the UE (100) is camped on the first VPLMN (200a) and that the SOR information security check is unsuccessful.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The present disclosure discloses relates to wireless communication, and more particularly to a method and a user equipment (UE) for managing a steering of roaming (SOR) information in an automatic network selection mode in a wireless communication network.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Steering of Roaming (SOR) information: This consists of the following HPLMN protected information:
 a) an indication of whether the UDM requests an acknowledgement from the UE for successful reception of the steering of roaming information; and
 b) one of the following:
  1. list of preferred PLMN/access technology combinations with an indication that it is included;
  2. a secured packet with an indication that it is included; or
  3. the HPLMN indication that 'no change of the "Operator Controlled PLMN Selector with Access Technology" list stored in the UE is needed and thus no list of preferred PLMN/access technology combinations is provided.

Accordingly the embodiments herein disclose a method for managing a steering of roaming (SOR) information by user equipment (UE) (100) in an automatic network selection mode in a wireless communication network. The method includes receiving, by the UE (100), the SOR information from one of a first visitor public land mobile network (first VPLMN) (200a) and a home public land mobile network (HPLMN) (300) and determining, by the UE (100), whether a SOR information security check is successful. Further, the method includes determining, by the UE (100), that the UE (100) is camped on one of the first VPLMN (200a) and the HPLMN (300) and performing, by the UE (100), one of: continuing, by the UE (100), to receive services from the HPLMN (300) to which the UE (100) is latched, in response to determining that the UE (100) is camped on the HPLMN (300) and the SOR information security check is one of successful and unsuccessful, continuing, by the UE (100), to receive services from the first VPLMN (200a) to which the UE (100) is latched, in response to determining that the UE (100) is camped on the first VPLMN (200a) and that the SOR information security check is successful, and automatically triggering, by the UE (100), a registration to a second VPLMN (200b) available in the wireless communication network, in response to determining that the UE (100) is camped on the first VPLMN (200a) and that the SOR information security check is unsuccessful.

If the UE (100) is configured to receive the steering of roaming (SOR) information during an initial registration procedure but does not receive the same in the initial registration accept message then the UE (100) will consider the scenario as a case of the SOR information security check failure. Thus a UDM shall provide the steering of roaming (SOR) information to the UE (100), during the UE's initial registration procedure if the UE (100) is configured to receive the steering of roaming information during the initial registration procedure and is currently registering with the VPLMN (200a). The UDM may not provide the steering of roaming information to the UE (100), if the UE (100) is currently registering with the HPLMN even though the UE (100) is configured to receive the steering of roaming information during the initial registration procedure, in this case the UE (100) shall "not" consider it as a case of the SOR information security check failure. This also leads to the lesser network side signaling between the UDM and the AMF as well as saving of the radio resources when the UE (100) is camped on the HPLMN (300) as typically the SOR information is big in size.

Referring now to the drawings and more particularly to FIGS. 1 through 5, where similar reference characters denote corresponding features consistently throughout the figure, these are shown preferred embodiments.

Figure 1:
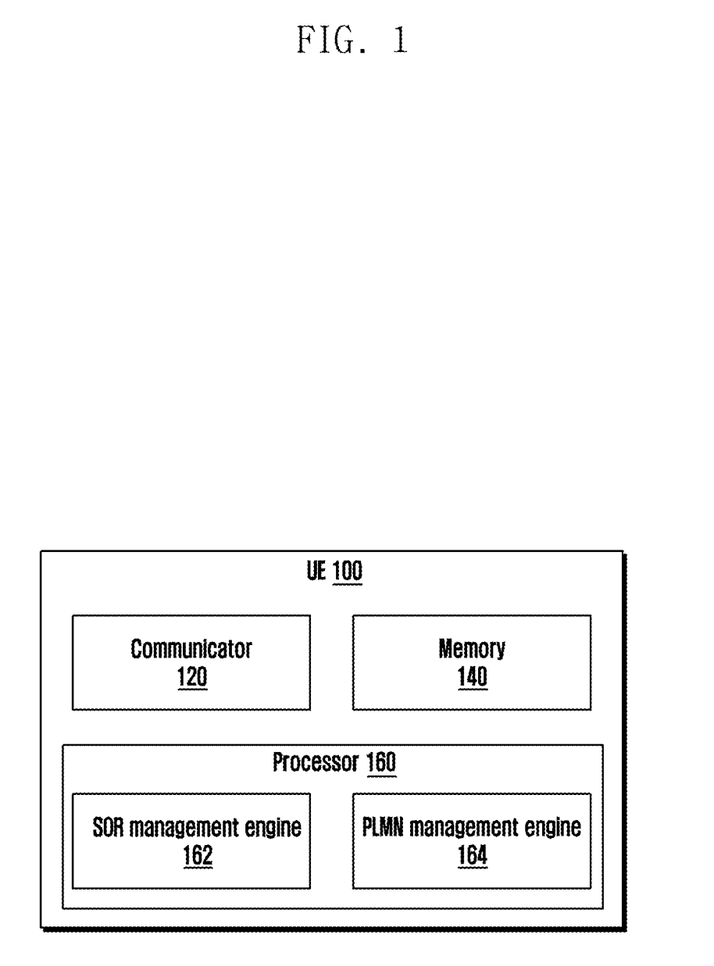
FIG. 1 illustrates the block diagram of user equipment (UE) (100) configured in an automatic network selection mode for managing a steering of roaming (SOR) information in a wireless communication network, according to an embodiment disclosed herein.

FIG. 1 illustrates the block diagram of user equipment (UE) (100) configured in an automatic network selection mode for managing a steering of roaming (SOR) information in a wireless communication network, according to an embodiment disclosed herein.

Referring to FIG. 1, the UE (100) includes a communicator (120), a memory (140) and a processor (160).

In an embodiment, the communicator (120) is configured to receive a downlink non-access stratum (DL NAS) transport message comprising the SOR information from one of a first visitor public land mobile network (first VPLMN) (200a) and a home public land mobile network (HPLMN) (300). The first VPLMN (200a) is a visitor PLMN to which the UE (100) is camped currently due to the mobility of the UE (100) away from the HPLMN (300). The HPLMN (300) is the PLMN which corresponds to a home network of the UE (100). In another embodiment, the communicator (120) is configured to receive an initial registration accept message from one of the first VPLMN (200a) and the HPLMN (300) where the UE (100) is pre-configured to receive the SOR information always in the initial registration accept message.

In an embodiment, the memory (140) can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (140) may, in some examples, be considered a non-transitory storage medium. The term "non-transitory" may indicate that the storage medium is not embodied in a carrier wave or a propagated signal. However, the term "non-transitory" should not be interpreted that the memory (140) is non-movable. In some examples, the memory (140) is configured to store larger amounts of information than the memory (140). In certain examples, a non-transitory storage medium may store data that can, over time, change (e.g., in Random Access Memory (RAM) or cache).

In an embodiment, the processor (160) includes a SOR management engine (162) and a PLMN management engine (164).

In an embodiment, the SOR management engine (162) is configured to extract the SOR information from the DL NAS transport message sent by the first VPLMN (200a). The SOR information includes a list of operator preferred PLMNs (OPLMN). The SOR management engine (162) is configured to determine whether a SOR information security check is successful. The SOR information security check is successful when one of: an integrity check performed on the SOR information is successful; and the UE (100) receives the SOR information as part of the initial registration accept message when the UE (100) is configured to receive the SOR information in the initial registration accept message. The SOR information security check is unsuccessful when one of: an integrity check performed on the SOR information is unsuccessful and the UE (100) does not receive the SOR information as part of the initial registration accept message when the UE (100) is configured to receive the SOR information in the initial registration accept message. The integrity check performed on the SOR information may include determining whether the SOR information received from the first VPLMN (200a) is corrupted/tampered etc.

In another embodiment, the SOR management engine (162) is configured to determine that the UE (100) is configured to receive the SOR information in the initial registration accept message and further determine whether the initial registration accept message includes the SOR information. The initial registration accept message is received from one of the first VPLMN (200a) and the HPLMN (300) in response to registering of the UE (100) with one of the first VPLMN (200a) and the HPLMN (300) by sending an initial registration request message.

In an embodiment, the PLMN management engine (164) is configured to determine that the UE (100) is camped on one of the first VPLMN (200a) and the HPLMN (300). Further, the PLMN management engine (164) is configured to continue to receive services from the HPLMN (300) to which the UE (100) is latched in response to determining that the UE (100) is camped on the HPLMN (300) and the SOR information security check is one of successful and unsuccessful. The UE (100) continues to receive services from the HPLMN (300) as per 3GPP standards as the UE (100) is attempting to register on the HPLMN (300) of the home network of the UE (100).

The PLMN management engine (164) is configured to continue to receive services from the first VPLMN (200a) to which the UE (100) is latched, in response to determining that the UE (100) is camped on the first VPLMN (200a) and that the SOR information security check is successful. The PLMN management engine (164) is configured to automatically trigger a registration to a second VPLMN (200b) available in the wireless communication network in response to determining that the UE (100) is camped on the first VPLMN (200a) and that the SOR information security check is unsuccessful. The automatic triggering of the registration to the second VPLMN (200b) includes receiving a Radio Resource Control (RRC) connection release message comprising an indication to the UE (100) to move to a RRC inactive state.

Further, the PLMN management engine (164) is configured to de-register from the first VPLMN (200a) to which the UE (100) is currently registered and select the second VPLMN (200b) which is the highest priority PLMN available as per the received OPLMN list in the SOR information. The PLMN management engine (164) then automatically registers the UE (100) with the second VPLMN (200b). The second VPLMN (200b) is a PLMN the UE (100) latches to after performing a PLMN selection procedure, with the first VPLMN (200a) which sends the SOR information being considered with as a lowest priority PLMN during the PLMN selection procedure.

Although the FIG. 1 shows the hardware elements of the UE (100) but it is to be understood that other embodiments are not limited thereon. In other embodiments, the UE (100)

may include less or more number of elements. Further, the labels or names of the elements are used only for illustrative purpose and does not limit the scope of the invention. One or more components can be combined together to perform same or substantially similar function.

Figure 2:
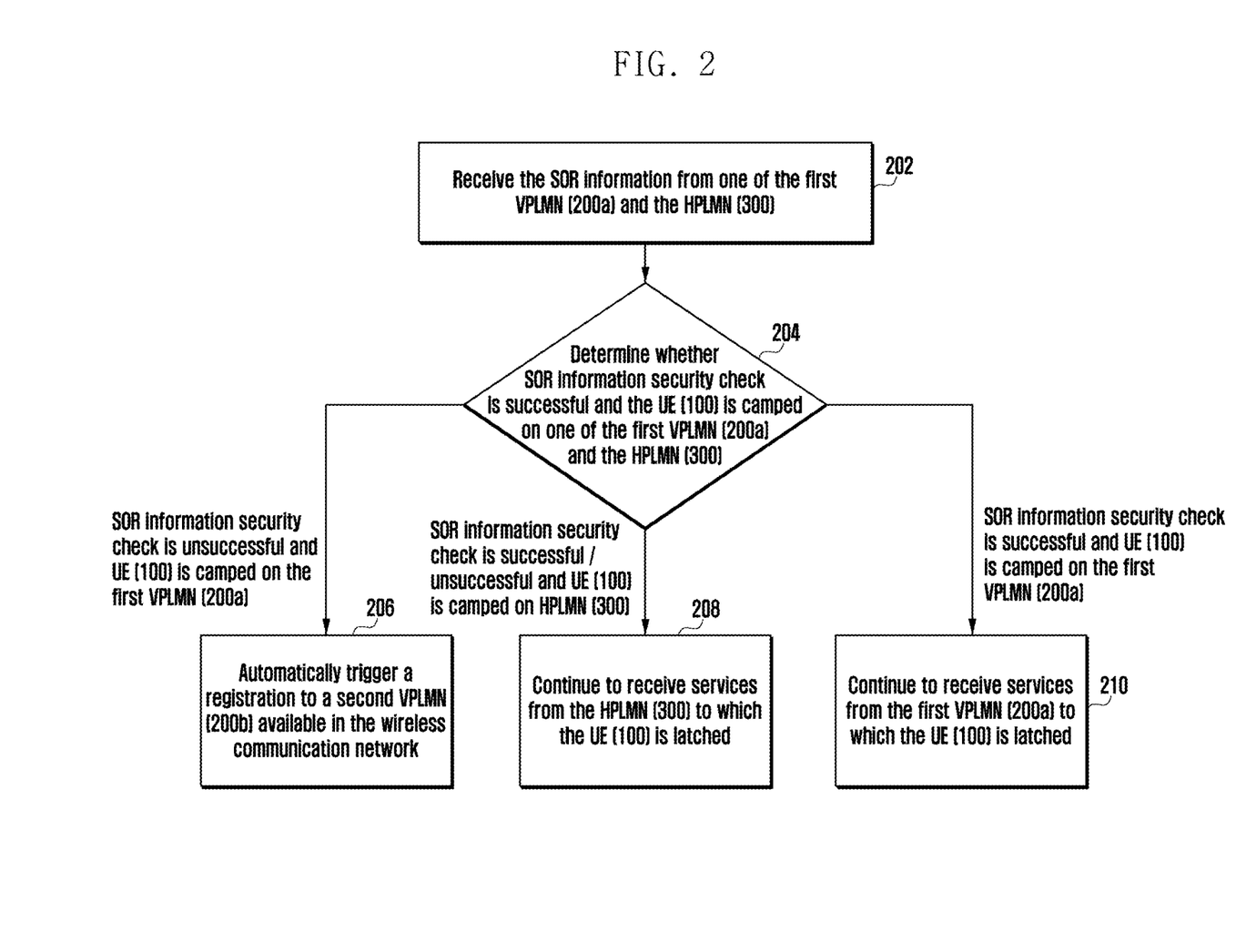
FIG. 2 is a flow chart illustrating a method managing the steering of roaming (SOR) information in the automatic network selection mode in the wireless communication network, according to an embodiment disclosed herein.

FIG. 2 is a flow chart illustrating a method managing the steering of roaming (SOR) information in the automatic network selection mode in the wireless communication network, according to an embodiment disclosed herein.

Referring to the FIG. 2, at step 202 the UE (100) receives the SOR information from one of the first VPLMN (200a) and the HPLMN (300). For example, in the UE (100) as illustrated in the FIG. 1, the communicator (120) can be configured to receive the SOR information from one of the first VPLMN (200a) and the HPLMN (300).

At step 204, the UE (100) determines whether the SOR information security check is successful and the UE (100) is camped on one of the first VPLMN (200a) and the HPLMN (300). For example, in the UE (100) as illustrated in the FIG. 1, the processor (160) can be configured to determine whether the SOR information security check is successful and the UE (100) is camped on one of the first VPLMN (200a) and the HPLMN (300).

At step 206, the UE (100) automatically triggers the registration to the second VPLMN (200b) available in the wireless communication network, in response to determining that the SOR information security check is unsuccessful and that the UE (100) is camped on the first VPLMN (200a). For example, in the UE (100) as illustrated in the FIG. 1, the processor (160) can be configured automatically trigger the registration to the second VPLMN (200b) available in the wireless communication network, in response to determining that the SOR information security check is unsuccessful and that the UE (100) is camped on the first VPLMN (200a).

At step 208, the UE (100) continues to receive services from the HPLMN (300) to which the UE (100) is latched, in response to determining that the SOR information security check is one of successful and unsuccessful and that the UE (100) is camped on the HPLMN (300). For example, in the UE (100) as illustrated in the FIG. 1, the processor (160) can be configured to continue to receive services from the HPLMN (300) to which the UE (100) is latched, in response to determining that the SOR information security check is one of successful and unsuccessful and that the UE (100) is camped on the HPLMN (300).

At step 210, the UE (100) continues to receive services from the first VPLMN (200a) to which the UE (100) is latched, in response to determining that the SOR information security check is successful and that the UE (100) is camped on the first VPLMN (200a). For example, in the UE (100) as illustrated in the FIG. 1, the processor (160) can be configured to continue to receive services from the first VPLMN (200a) to which the UE (100) is latched, in response to determining that the SOR information security check is successful and that the UE (100) is camped on the first VPLMN (200a).

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Figure 3A:
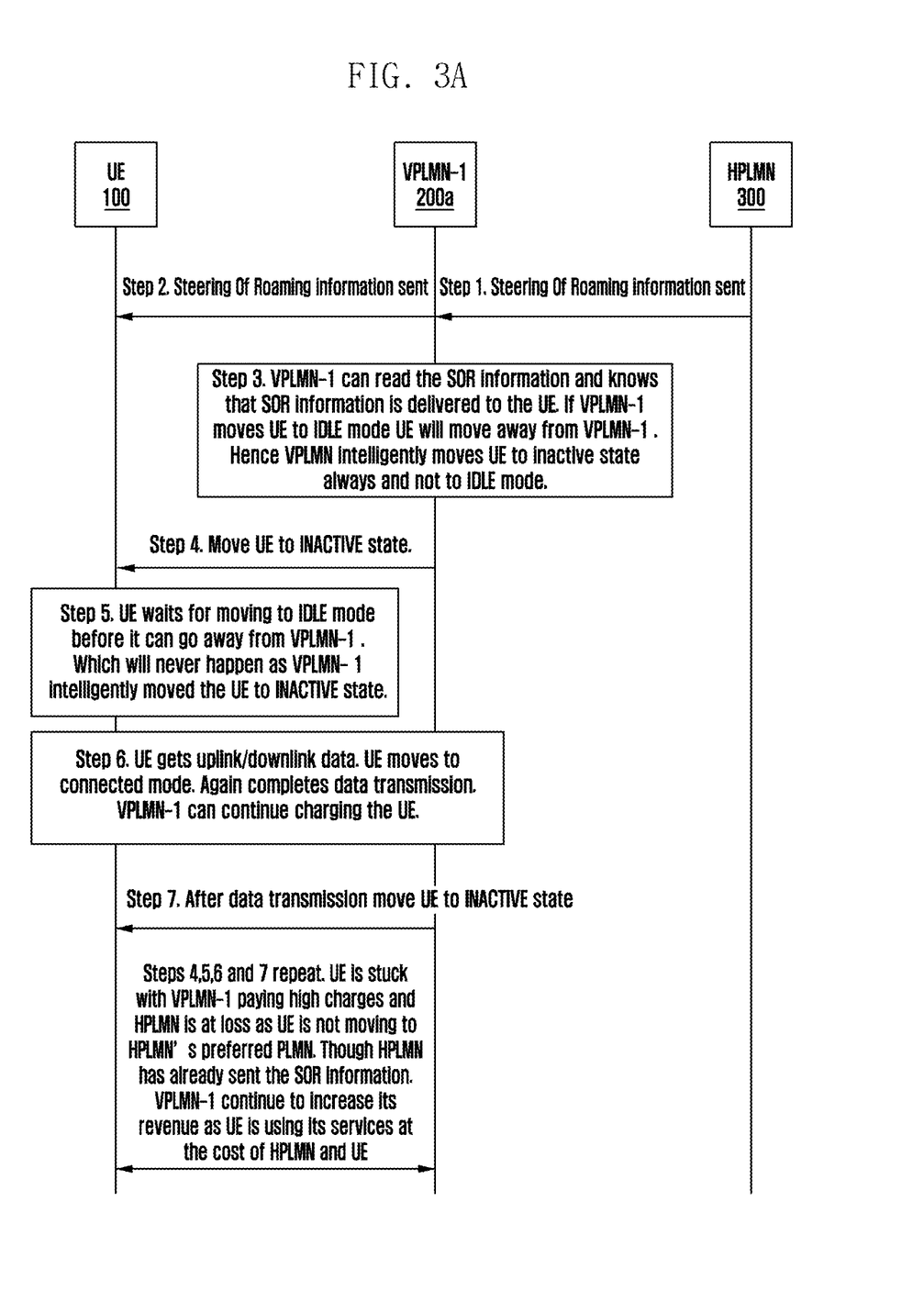
FIG. 3A is a signalling diagram illustrating the existing procedure performed by the UE (100) on receiving the SOR information from a VPLMN-1 (200a), according to prior art.

FIG. 3A is a signalling diagram illustrating the existing procedure performed by the UE (100) on receiving the SOR information from the VPLMN-1 (200a), according to prior art.

The steering of roaming (SOR) is a procedure in which the home network (HPLMN) (300) provides the list of preferred PLMN's to the UE (100) using which the UE (100) decides which PLMN to get service from out of all the available PLMN's in the area. The SOR procedure is important because the SOR information has direct impact on the home operator's revenues. For example if the HPLMN (300) has a profitable roaming agreement with the VPLMN-1 (200a) and a not so good agreement with a VPLMN-2 (200b) then the HPLMN (300) will prefer the UE (100) to always use the services from the VPLMN-1 (200a). However, due to certain issues while delivering the SOR information or due to fraudulent implementation (referred to as anti-SOR mechanisms in standard specifications) by the VPLMN-2 (200b) if the UE (100) continues to use services from the VPLMN-2 (200b) then the VPLMN-2 (200b) may increase the revenue acquired. However, the anti-SOR mechanisms may impact the revenues of the HPLMN (300).

Referring to the FIG. 3A, at step 1 and step 2, the HPLMN (300) sends the steering of roaming (SOR) information to the UE (100) which is mobile through the VPLMN-1 (200a) to which the UE (100) is currently latched.

At step 3, the VPLMN-1 (200a) accesses the SOR information and determines that the SOR information is delivered to the UE (100). At step 3, in case the VPLMN-1 (200a) moves the UE (100) to the idle state the UE (100) will move away from the VPLMN-1 (200a) to the preferred PLMN based on the SOR information received and hence the VPLMN-1 (200a) may not be able to charge the services accessed by the UE (100). Hence the VPLMN-1 (200a) intelligently moves the UE (100) to the inactive state always and not to the idle mode, as shown in step 4.

At step 5, the UE (100) infinitely waits to move to the idle state before the UE (100) can move away from the VPLMN-1 (200a). However, the UE (100) will not be able to move to the idle state since the VPLMN-1 (200a) has intelligently moved the UE (100) to the inactive state.

At step 6, in case the UE (100) initiates for example a browsing session due to which the UE (100) accesses the uplink/downlink data from the VPLMN-1 (200a) during which the UE (100) is moved to a connected state. In the connected state the VPLMN-1 (200a) continuously charges the UE (100) for the uplink/downlink data that the UE (100) consumes.

Further, at step 7, when the data transmission is completed the VPLMN-1 (200a) moves the UE (100) back to the inactive state. Furthermore, the steps 4-7 are repeated cyclically and the UE (100) gets confined to the VPLMN-1 (200a). Also the VPLMN-1 (200a) charges high costs for the data consumed by the UE (100) and hence, the HPLMN (300) is at loss as the UE (100) is not moving to the HPLMN's (300) preferred PLMN even though the HPLMN (300) has shared the SOR information to the UE (100).

Figure 3B:
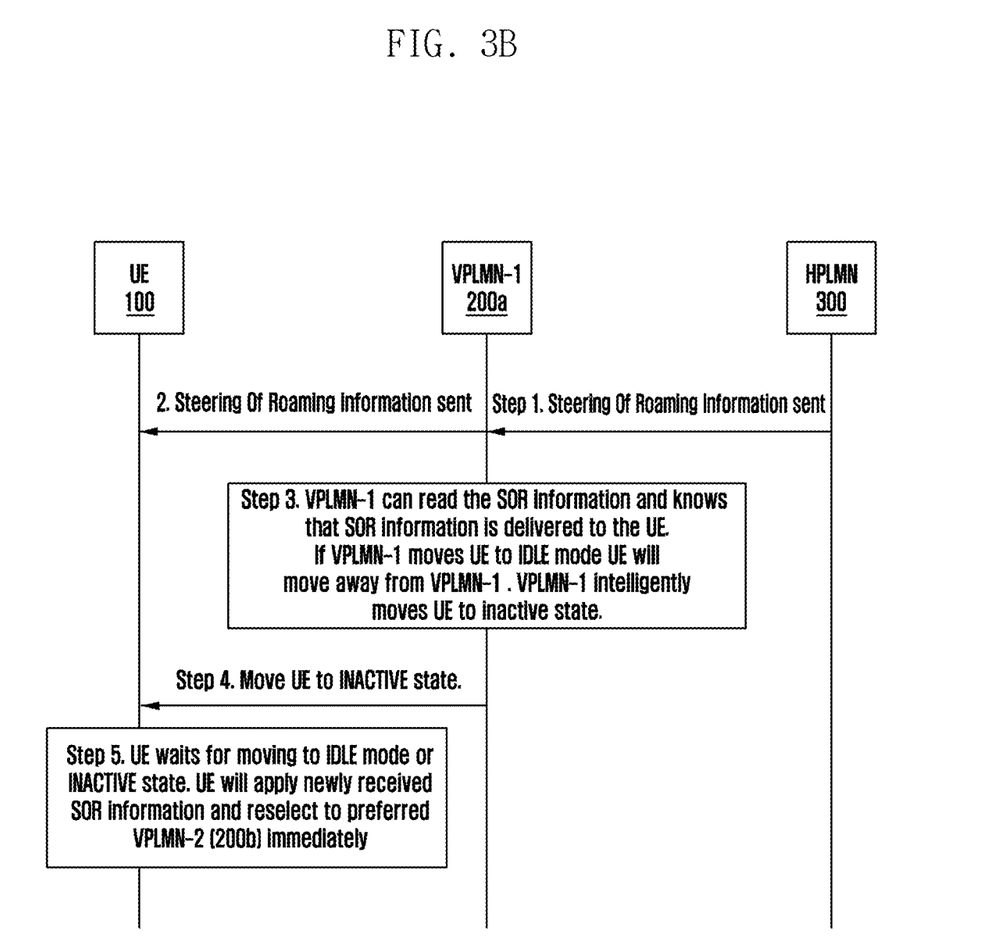
FIG. 3B is a signalling diagram illustrating the automatic triggering of the registration of the UE (100) to the second VPLMN (VPLMN-2) (200b) available in the wireless communication network based on the SOR information, according to an embodiment disclosed herein.

FIG. 3B is a signalling diagram illustrating the automatic triggering of the registration of the UE (100) to the second VPLMN (200b) available in the wireless communication network based on the SOR information, according to an embodiment disclosed herein.

Referring to the FIG. 3B, in conjunction with the FIG. 3A, at step 1 and the step 2, the HPLMN (300) sends the SOR information to the UE (100) which through the VPLMN-1 (200a) to which the UE (100) is currently latched.

At step 3, the VPLMN-1 (200a) accesses the SOR information and determines that the SOR information is delivered to the UE (100). At step 3, in case the VPLMN-1 (200a) moves the UE (100) to the IDLE mode the UE (100) will move away from the VPLMN-1 (200a) and hence the VPLMN-1 (200*a*) may not be able to charge the services accessed by the UE (100). Hence the VPLMN-1 (200*a*) intelligently moves the UE (100) to inactive state always and not to the IDLE state, as shown in step 4.

Unlike to the conventional methods and systems, in the proposed method the UE (100) does not wait to be moved to the IDLE state from the inactive state. At step 5, the UE (100) will apply the SOR information received from the HPLMN (300) through the VPLMN-1 (200*a*) and reselects to a preferred new VPLMN i.e., VPLMN-2 (200*b*) immediately based on the SOR information. Therefore, the UE (100) is not confined to the VPLMN-1 (200*a*) which purposely moves the UE (100) into the inactive state and not to the IDLE state.

Figure 4A:
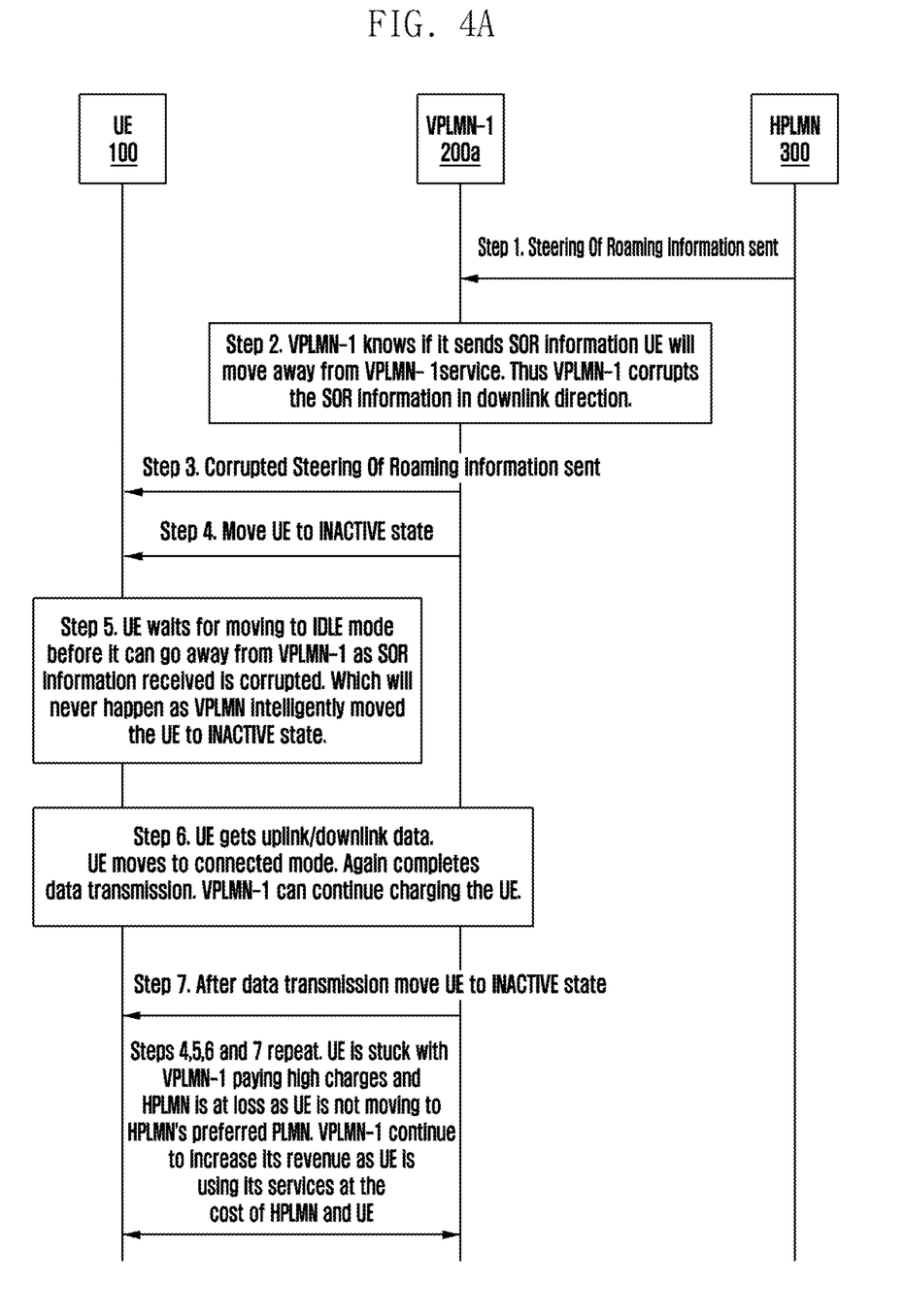
FIG. 4A is a signalling diagram illustrating the existing procedure performed by the UE (100) in response to determining that the integrity check performed on the SOR information received from the VPLMN-1 (200a) is unsuccessful, according to prior art.

FIG. 4A is a signalling diagram illustrating the existing procedure performed by the UE (100) in response to determining that the integrity check performed on the SOR information received from the VPLMN-1 (200*a*) is unsuccessful, according to prior art.

Referring to the FIG. 4A, at step 1 the HPLMN (300) sends the steering of roaming (SOR) information to the UE (100) which is mobile through the VPLMN-1 (200*a*) to which the UE (100) is currently latched.

At step 2, the VPLMN-1 (200*a*) determines that if the VPLMN-1 (200*a*) sends the SOR information to the UE (100), the UE (100) will move away from the VPLMN-1 (200*a*). Thus the VPLMN-1 (200*a*) corrupts the SOR information in the downlink direction i.e., the VPLMN (200*a*) tampers the SOR information received from the HPLMN (300). For example, the VPLMN-1 (200*a*) may tamper the SOR information by allocating the highest priority to the VPLMN-1 (200*a*) in the list of OPLMNs so that the roaming UE (100) remains latched to the VPLMN-1 (200*a*). Further, at step 3, the VPLMN-1 (200*a*) sends the corrupted SOR information to the UE (100).

At step 4, the VPLMN-1 (200*a*) intelligently moves the UE (100) to inactive state. At step 5, the UE (100) performs the integrity check on the SOR information received from the VPLMN-1 (200*a*) and determines that the SOR information received from the VPLMN-1 (200*a*) is corrupted based on the integrity check and waits to be moved into the IDLE state so that the UE (100) can latch to a different VPLMN. However, the UE (100) will not be able to move to the IDLE state since the VPLMN-1 (200*a*) has intelligently moved the UE (100) to the INACTIVE state.

At step 6, the UE (100) accesses the uplink/downlink data from the VPLMN-1 (200*a*) during which the UE (100) is moved to a connected state. In the connected state the VPLMN-1 (200*a*) continuously charges the UE (100) for the uplink/downlink data that the UE (100) consumes.

Further, at step 7, when the data transmission is completed, the VPLMN-1 (200*a*) moves the UE (100) back to the INACTIVE state. Furthermore, the steps 4-7 are repeated cyclically and the UE (100) gets confined to the VPLMN-1 (200*a*). Also the VPLMN-1 (200*a*) charges high costs for the data consumed by the UE (100) and hence, the HPLMN (300) is at loss as the UE (100) is not moving to the HPLMN's preferred PLMN even though the HPLMN (300) has shared the SOR information to the UE (100).

Figure 4B:
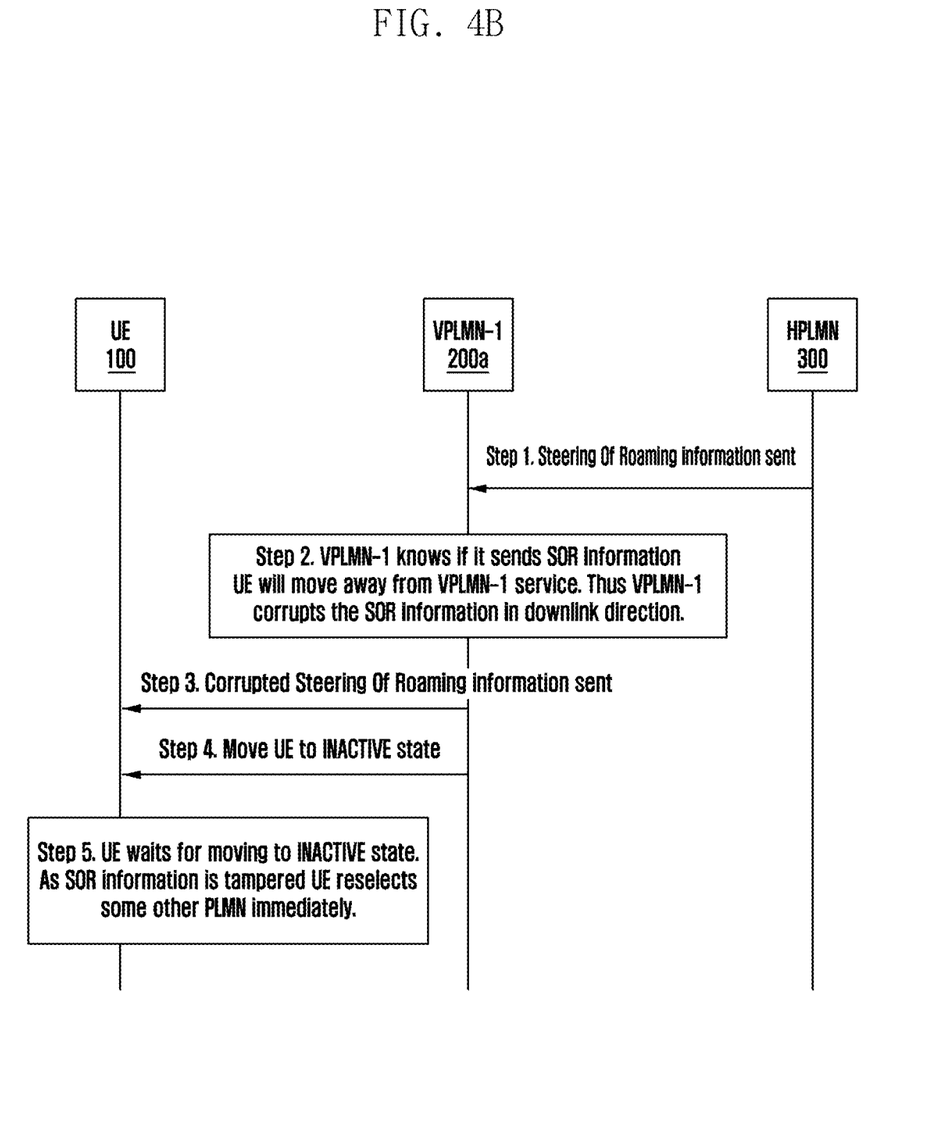
FIG. 4B is a signalling diagram illustrating the procedure for selecting any other PLMN by the UE (100) in response to determining that the integrity check performed on the SOR information received from the VPLMN-1 (200a) is unsuccessful, according to an embodiment disclosed herein.

FIG. 4B is a signalling diagram illustrating the procedure for selecting any other PLMN by the UE (100) in response to determining that the integrity check performed on the SOR information received from the VPLMN-1 (200*a*) is unsuccessful, according to an embodiment disclosed herein.

Referring to the FIG. 4B in conjunction with the FIG. 4A, the step 1 to step 4 in the FIG. 4B may be substantially the same as step 1 to step 4 in the FIG. 4A and thus repeated description is omitted.

At step 5, unlike to the conventional methods and systems, in the proposed method the UE (100) waits for moving to the INACTIVE state but since the UE (100) has already determined that the SOR information is tampered based on the unsuccessful integrity check performed on the SOR information, the UE (100) reselects any other PLMN available based on the operator preferred list which is available with a subscriber identification module (SIM) of the UE (100) and moved away from the VPLMN-1 (200*a*) to which the UE (100) is latched. Further, while selecting the any other PLMN based on the operator preferred list which is available with the SIM of the UE (100), the UE (100) excludes the VPLMN-1 (200*a*) to which the UE (100) is currently latched by considering the VPLMN-1 (200*a*) with the lowest priority.

Since, the UE (100) moves away from the VPLMN-1 (200*a*) and latches to any other PLMN available, the VPLMN-1 (200*a*) may not be able to charge exorbitantly for the data consumption by the UE (100) due to roaming.

Figure 5:
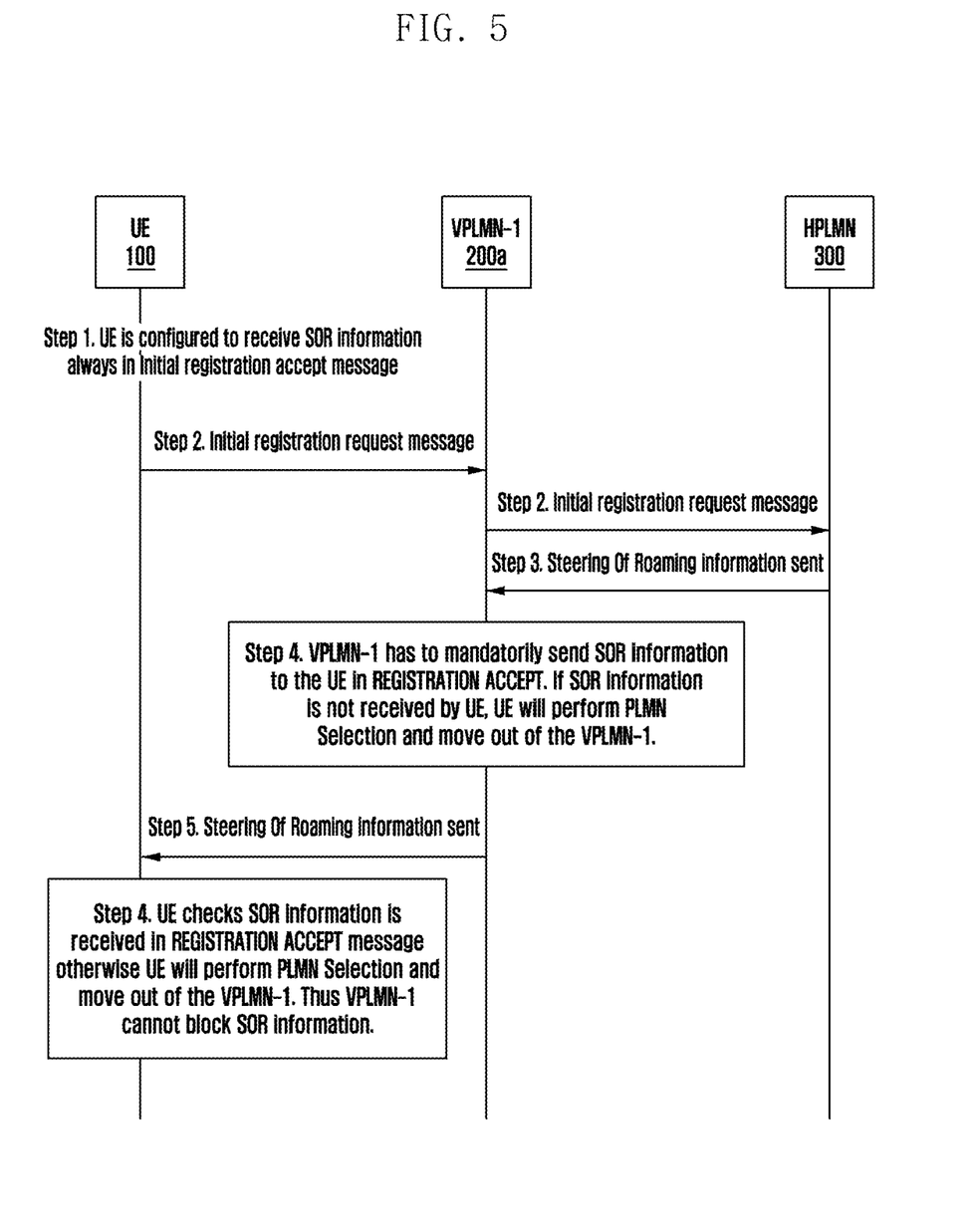
FIG. 5 is a signalling diagram illustrating the procedure for selecting any other PLMN by the UE (100) in response to determining that the SOR information is not received in the registration accept message from the VPLMN-1 (200a) when the UE (100) is configured to receive the SOR information in the initial registration accept message, according to an embodiment disclosed herein.

FIG. 5 is a signalling diagram illustrating the procedure for selecting any other PLMN by the UE (100) in response to determining that the SOR information is not received in the registration accept message from the VPLMN-1 (200*a*) when the UE (100) is configured to receive the SOR information in the initial registration accept message, according to an embodiment disclosed herein.

Consider a scenario where the HPLMN (300) has sent the SOR information to the UE (100) through the VPLMN-1 (200*a*), but the VPLMN-1 (200*a*) blocks the SOR information and does not transmit the same to the UE (100). The said scenario is addressed in the proposed method by configuring the UE (100) to mandatorily receive the SOR information as part of the registration accept message from the HPLMN (300). Therefore, each time the UE (100) triggers the initial registration procedure, the HPLMN (300)-UDM mandatorily provides the SOR information to the UE (100).

Referring to the FIG. 5, at step 1, the UE (100) initiates the initial registration procedure by sending the initial registration request message to the HPLMN (300). The UE (100) is configured to receive the SOR information in the initial registration accept message by introducing a configuration bit in the initial registration request message. At step 2, the initial registration request message is forwarded to the HPLMN (300).

Further, at step 3, in response to the initial registration request message, the HPLMN (300) sends the registration accept message. At step 4, the VPLMN-1 (200*a*) has to mandatorily send the SOR information to the UE (100) in the registration accept message. If the SOR information is not received by the UE (100) then the UE (100) determines that the SOR information security check is unsuccessful and the UE (100) performs the PLMN selection and move out of the VPLMN-1 (200*a*).

However, in the conventional methods and systems, the SOR information has to be mandatorily shared with the UE (100) in the registration accept message even if the UE (100) is camped on the HPLMN (300). The mandatorily sharing of the SOR information to the UE (100) even by the HPLMN (300) increases the cost of the operator heavily as 95% of the UE's will be in the home network and sending the SOR information to those UE's may be unnecessary as the UE (100) will have to anyways remain on the HPLMN (300) for accessing the services. Therefore, in the proposed method, the mandatory providing of the SOR information is avoided when the UE (100) is camped on and performing the initial registration on the HPLMN (300). i.e., the SOR information should be mandatorily provided to the UE (100) only if the UE (100) is camped on the VPLMN-1 (200a) and not when the UE (100) is camped on the HPLMN (300). Therefore, the UE (100) continues to receive services from the HPLMN (300) to which the UE (100) is latched when the UE (100) is camped on the HPLMN (300), irrespective of the SOR information security check is one of successful and unsuccessful. On the similar lines even if the integrity check i.e. MAC check on the SOR information element is not successful and if the UE is camped on the Home PLMN then UE can neglect the SOR check failure case and remain camped or latched on to HPLMN to receive the service. As it can safely be assumed that HPLMN will not intentionally corrupt the SOR information while sending it to its own subscribers.

Further, at step 5, the VPLMN-1 (200a) shares the SOR information with the UE (100).

At step 6, the UE (100) determines whether the SOR information is received in the registration accept message. In response to determining that the SOR information is not received in the registration accept message, the UE (100) automatically performs the PLMN selection and moves out of the VPLMN-1 (200a) by latching to any available PLMN in the area. In response to determining that the SOR information is received in the registration accept message, the UE (100) either continues with the VPLMN-1 (200a) or switches to the other VPLMN i.e., the VPLMN-2 (200b) based on the list of operator preferred PLMNs provided in the SOR information. Thus in the proposed method the VPLMN-1 (200a) cannot block SOR information which needs to be shared with the UE (100). At the same time, when the UE (100) is camped with the HPLMN (300), the mandatory requirement of the SOR information in the registration accept message is done away with to achieve cost saving and resource optimization.

The embodiments disclosed herein can be implemented through at least one software program running on at least one hardware device and performing network management functions to control the elements. The elements shown in the FIGS. 1 to 5 include blocks, elements, actions, acts, steps, or the like which can be at least one of a hardware device, or a combination of hardware device and software module.

Although the present disclosure has been described with various embodiments, various changes and modifications may be suggested to one skilled in the art. It is intended that the present disclosure encompass such changes and modifications as fall within the scope of the appended claims.

What is claimed is:

1. A method by a user equipment (UE) related to an automatic network selection mode in a wireless communication network system, comprising:
   receiving, by the UE, a downlink non-access stratum (DL NAS) transport message that includes steering of roaming (SOR) information from a first visitor public land mobile network (first VPLMN);
   determining, by the UE, whether an SOR information security check is successful;
   in response to determining that the SOR information security check is unsuccessful, waiting for the UE to move to an RRC inactive state; and
   attempting, by the UE after moving to the RRC inactive state, to obtain service on a second VPLMN available in the RRC inactive state.

2. The method as claimed in claim 1, further comprising:
   receiving, by the UE, a RRC connection release message comprising an indication to the UE to move to the RRC inactive state.

3. The method as claimed in claim 1, wherein the SOR information security check is related to performing an integrity check on the SOR information received from the first VPLMN.

4. The method as claimed in claim 1, wherein the second VPLMN is a PLMN the UE latches to after performing a PLMN selection procedure, with the first VPLMN which sends the SOR information being considered as a lowest priority PLMN during the PLMN selection procedure.

5. The method as claimed in claim 1, further comprising:
   de-registering, by the UE, from the first VPLMN to which the UE is currently registered;
   selecting, by the UE, the second VPLMN which is the highest priority PLMN available as per a received operator preferred PLMN (OPLMN) list in the SOR information; and
   automatically registering, by the UE, with the second VPLMN.

6. A user equipment (UE) configured in an automatic network selection mode in a wireless communication network system, comprising:
   a memory;
   a communicator configured to receive and transmit a signal;
   a processor coupled to the memory and configured to:
      control the communicator to receive a downlink non-access stratum (DL NAS) transport message that includes steering of roaming (SOR) information from a first visitor public land mobile network (first VPLMN);
      determine whether an SOR information security check is successful;
      in response to determining that the SOR information security check is unsuccessful, wait for the UE to move to an RRC inactive state; and
      attempt, after moving to the RRC inactive state, to obtain service on a second VPLMN available in the RRC inactive state.

7. The UE as claimed in claim 6, wherein the processor is further configured to:
   control the communicator to receive a RRC connection release message comprising an indication to the UE to move to the RRC inactive state.

8. The UE as claimed in claim 6, wherein the SOR information security check is related to performing an integrity check on the SOR information received from the first VPLMN.

9. The UE as claimed in claim 6, wherein the second VPLMN is a PLMN the UE latches to after performing a PLMN selection procedure, with the first VPLMN which sends the SOR information being considered as a lowest priority PLMN during the PLMN selection procedure.

10. The UE as claimed in claim 6, wherein the processor is further configured to:
   de-register from the first VPLMN to which the UE is currently registered;
   select the second VPLMN which is the highest priority PLMN available as per a received operator preferred PLMN (OPLMN) list in the SOR information; and
   automatically register with the second VPLMN.

* * * * *